(12) United States Patent
Nitschmann, III (10) Patent No.: US 11,713,971 B2
(45) Date of Patent: Aug. 1, 2023

(54) METHOD FOR REPLACING AGRICULTURAL EQUIPMENT

(71) Applicant: CNH Industrial America LLC, New Holland, PA (US)

(72) Inventor: Otto Nitschmann, III, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 636 days.

(21) Appl. No.: 16/787,391

(22) Filed: Feb. 11, 2020

(65) Prior Publication Data
US 2021/0247194 A1 Aug. 12, 2021

(51) Int. Cl.
| | | |
|---|---|---|
| G01C 21/34 | (2006.01) | |
| G05D 1/00 | (2006.01) | |
| G05D 1/02 | (2020.01) | |
| G06Q 10/083 | (2023.01) | |
| G01C 21/36 | (2006.01) | |
| A01D 43/08 | (2006.01) | |

(52) U.S. Cl.
CPC ....... *G01C 21/3407* (2013.01); *G01C 21/362* (2013.01); *G05D 1/0088* (2013.01); *G05D 1/0212* (2013.01); *G06Q 10/083* (2013.01); *A01D 43/08* (2013.01); *G05D 2201/0213* (2013.01)

(58) Field of Classification Search
CPC .............. G01C 21/3407; G01C 21/362; G05D 1/0088; G05D 1/0212; G05D 2201/0213; G06Q 10/083; A01D 43/08
See application file for complete search history.

(56) References Cited

U.S. PATENT DOCUMENTS

| | | | | |
|---|---|---|---|---|
| 10,310,500 | B1* | 6/2019 | Brady | G05D 1/0291 |
| 2015/0081161 | A1* | 3/2015 | Chapman | G06Q 10/00 |
| | | | | 701/31.5 |
| 2015/0371456 | A1* | 12/2015 | Moore, Jr. | G01S 19/13 |
| | | | | 701/1 |
| 2020/0219332 | A1* | 7/2020 | Shekar | G07C 5/008 |

FOREIGN PATENT DOCUMENTS

AU  2019464395 A1 * 3/2022 ............ B60W 60/00

OTHER PUBLICATIONS

DE 102015208914 A1, Published Nov. 3, 2016 (Year: 2016).*

* cited by examiner

*Primary Examiner* — Calvin Cheung
(74) *Attorney, Agent, or Firm* — Rickard K. DeMille; Rebecca L. Henkel (57) ABSTRACT

A method for delivering at least one replacement machine to replace at least one broken-down machine. The method includes providing a delivery system with at least one transport vehicle for transporting the at least one replacement machine and a controller. The method also includes receiving, by the controller, information that includes standby location variables and calculating, by the controller, a standby location for the at least one transport vehicle based upon the standby location variables. The method also includes sending, by the controller, the standby location to the at least one transport vehicle. The method further includes positioning, by the at least one transport vehicle, the at least one replacement machine at the standby location.

18 Claims, 6 Drawing Sheets

METHOD FOR REPLACING AGRICULTURAL EQUIPMENT

BACKGROUND OF THE INVENTION

The present invention pertains to capital goods, such as agricultural equipment, and, more specifically, to a service model of replacing broken-down equipment which can halt production.

A self-propelled forage harvester is used to pick up crop from a field and process the crop so that the crop may be subsequently used as forage or silage for animals. A typical forage harvester includes a detachable head to cut and lift the crop from the field, a chopper for cutting the crop into small pieces, and a paddle accelerator for forcing the cut crop out through a chute and into a trailer or wagon being pulled by a trailing vehicle.

An industrial or large-scale forage harvesting operation typically requires the use of multiple forage harvesters to efficiently pick crop from the field. Additionally, an entire support system is needed to assist the multiple forage harvesters. The support system typically includes several supporting units such as trailing tractors with trailers for receiving the crop from a respective harvester. Once the trailer of the tractor is filled with crop, the tractor will make roundtrips from the field to another location, usually the farm headquarters, to deposit the crop into storage containers and then return to the field to be filled with crop material again. This process may be repeated multiple times until the field has been completely harvested.

Although the use of multiple forage harvesters in a large-scale harvesting operation can be efficient, the process may nevertheless lead to inefficiencies if one of the operating forage harvesters breaks down. For instance, if a forage harvester breaks down then the people operating the supporting units may be forced to idly wait until the broken-down forage harvester is replaced or repaired. As can be appreciated, the downtime not spent harvesting may be significantly costly. To mitigate this potential cost, a farmer, or fleet manager, may purchase and transport an auxiliary or spare forage harvester to the field just to have it on hand in case one of the primary, i.e., presently operating, forage harvesters breaks down. For example, a farmer may have one spare forage harvester for every three primary forage harvesters. Hence, in the event of a primary equipment failure, the spare forage harvester may quickly replace the broken-down primary forage harvester; thus, decreasing the overall idle time spent not harvesting. However, for some farmers it may be cost-prohibitive and impractical to obtain and upkeep spare equipment for replacing primary equipment in the case of a primary equipment failure.

What is needed in the art is a system for rapidly replacing broken-down equipment in order to decrease an amount of non-harvesting time.

SUMMARY OF THE INVENTION

In one exemplary embodiment formed in accordance with the present invention, there is provided a method for delivering spare agricultural equipment, such as forage harvesters or other machines, to a field for replacing broken-down equipment. The method includes providing a delivery system that services multiple fields with one or more replacement machines. The method also includes receiving information by the controller of the delivery system, calculating a standby location for the replacement machine, sending the calculated standby location to the transport vehicle, and positioning the replacement machine in the standby location.

In another exemplary embodiment formed in accordance with the present invention, there is provided a method for delivering at least one replacement machine to replace at least one broken-down machine. The method includes an initial step of providing a delivery system. The delivery system includes at least one transport vehicle for transporting the at least one replacement machine and a controller operably coupled to and in communication with the at least one transport vehicle. The method also includes receiving, by the controller, information that includes standby location variables. The method also includes calculating, by the controller, a standby location for the at least one transport vehicle based upon the standby location variables. The method also includes sending, by the controller, the standby location to the at least one transport vehicle. The method further includes positioning, by the at least one transport vehicle, the at least one replacement machine at the standby location.

In another exemplary embodiment formed in accordance with the present invention, there is provided a delivery system for delivering at least one replacement machine to replace at least one broken-down machine. The delivery system includes at least one transport vehicle for transporting the at least one replacement machine and a controller operably coupled to and in communication with the at least one transport vehicle. The controller is configured for receiving information that includes standby location variables. The controller is also configured for calculating a standby location for the at least one transport vehicle based upon the standby location variables and sending the standby location to the at least one transport vehicle. The at least one transport vehicle is configured for positioning the at least one replacement machine at the standby location.

One possible advantage of the exemplary embodiment of the delivery system is that a business owner, for example a farmer, no longer needs to have spare equipment on hand at the field because the delivery system may readily deliver the spare equipment as needed within a guaranteed timeframe.

Another possible advantage of the exemplary embodiment of the delivery system is that the overall efficiency of the operation may be increased because the customer may operate all machines at one time without needing to reserve one of the units as a spare in case of an equipment failure.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
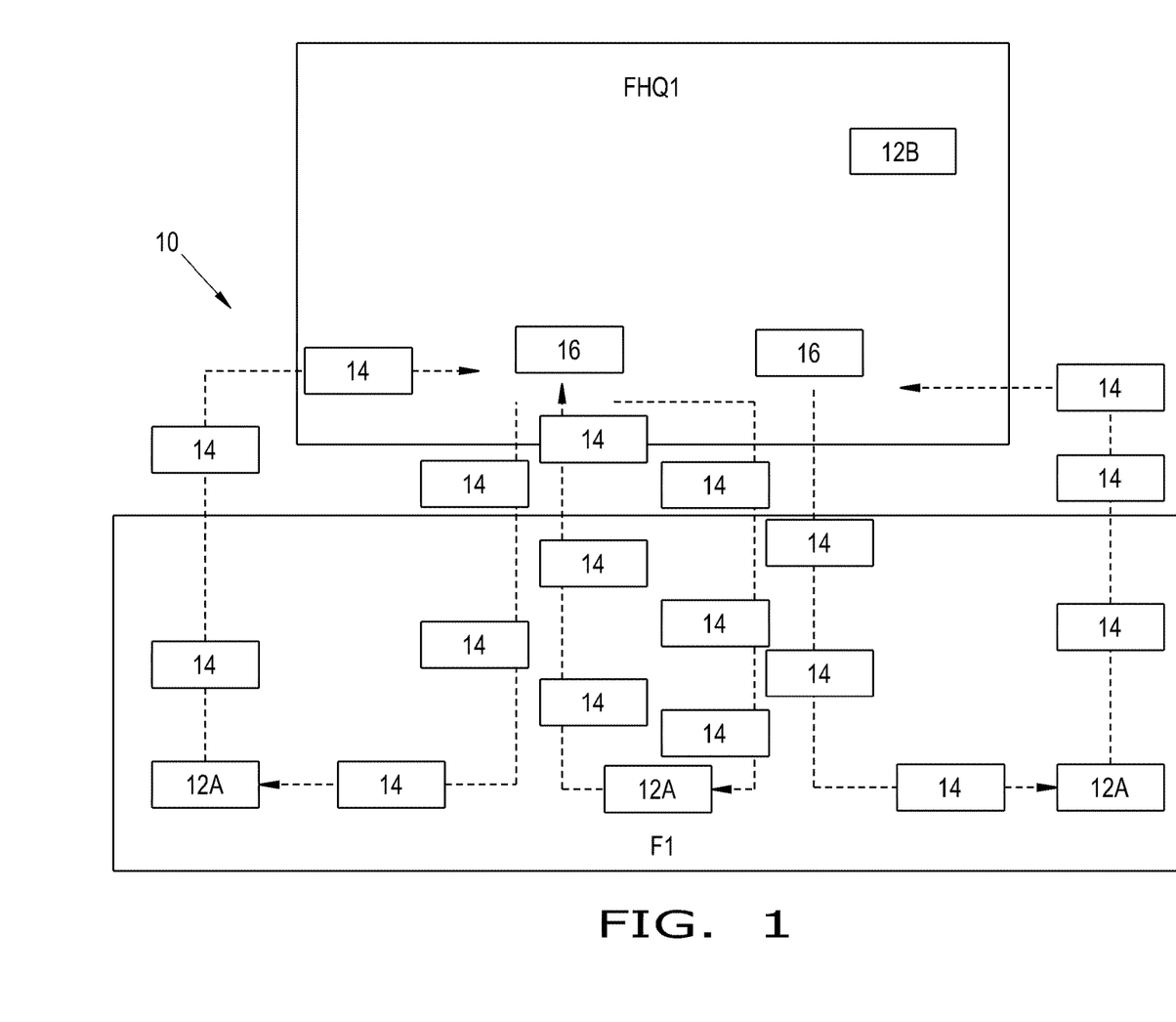
FIG. 1 illustrates a schematic view of a typical forage harvesting system.

Referring now to the drawings, and more particularly to FIG. 1, there is shown a typical forage harvesting system or operation 10. Generally, the operation 10 includes harvesting the field F1 using multiple forage harvesters 12A, 12B, trailing supporting vehicles 14 such as tractor trailers 14, and one or more forage compactors 16. During harvesting, each forage harvester 12A picks up the crop, e.g. corn, from the field F1, processes the picked crop by chopping it into small pieces, and delivers the processed crop material to a respective tractor trailer 14 which travels alongside the forage harvester 12A. The tractor trailers 14 conduct numerous iterations of following the forage harvester 12A for filling itself up with the processed crop material and transporting the processed crop material from the field F1 to the forage compactors 16 at the farm's headquarters FHQ1. The forage compactors 16 compact and mix the processed crop material into a forage product, which is typically used for animal feed.

It is generally beneficial to quickly harvest a field F1 using multiple forage harvesters 12A. However, the number of forage harvesters 12A operating in the field F1 at a given time may be limited by the potential cost due to an equipment failure. For instance, if a forage harvester 12A breaks down due to a mechanical failure, then the supporting tractor trailers 14 must wait idly by until the forage harvester 12A is repaired or replaced. Also, the time spent to repair or replace the broken-down forage harvester 12A equates to non-harvesting downtime, which reduces the efficiency and increases the cost of the operation 10. As can be appreciated, this unproductive time may be significantly costly. Thus, given the high operating cost of operating multiple forage harvesters 12A, the operation 10 will typically have an auxiliary or spare forage harvester 12B for every three primary and presently operating forage harvesters 12A. Thereby, if a forage harvester 12A does break down, then the spare forage harvester 12B may quickly replace the broken-down forage harvester 12A, reducing the overall amount of unproductive time. Unfortunately, even though the spare forage harvester 12B may be beneficial in the event of an equipment failure, purchasing and maintaining the spare forage harvester 12B nevertheless increases the overall cost of the operation 10.

Referring now to the drawings, and more particularly to FIGS. 2-5, there is shown a schematic view of a delivery system 20 for dually delivering at least one replacement capital good and replacing at least one broken-down capital good, in accordance with an exemplary embodiment of the present invention. The delivery system 20 may be used to deliver and replace any desired capital good for any desired production process. For instance, the delivery system 20 may be an agricultural delivery system 20 wherein the delivery system 20 delivers agricultural replacement equipment to replace broken-down agricultural equipment. For example, the delivery system 20 may preposition one or more replacement forage harvesters 22B in a standby location SL, and upon one or more forage harvesters 22A breaking down, the delivery system 20 may deliver the forage harvester(s) 22B to replace the broken-down forage harvester(s) 22A in the field F1, F2, F3, F4. However, it should be appreciated that the delivery system 20 may be used to deliver any desired agricultural equipment, such as headers, combines, tractors, and/or implements, or any component thereof to the field F1, F2, F3, F4 and/or farm headquarters FHQ1, FHQ2, FHQ3, FHQ4. The delivery system 20 generally includes at least one transport vehicle 24 for transporting the at least one forage harvester 22B and a controller 26 operably coupled to and in communication with the at least one transport vehicle 24. The delivery system 20 may further include one or more service indicators 30, 32 that are operably coupled to the controller 26 for sending a service signal to the controller 26, which indicates a need for replacing the broken-down forage harvester 22A.

The delivery system 20 may deliver only one forage harvester 22B (FIGS. 2-4) or multiple forage harvesters 22B (FIG. 5) to one or more fields F1, F2, F3, F4, F5 which are presently being harvested. The forage harvesters 22B may be substantially similar to the forage harvesters 12B as described above. Therefore, the forage harvesters 22B may be in the form of any desired forage harvesters.

Figure 4:
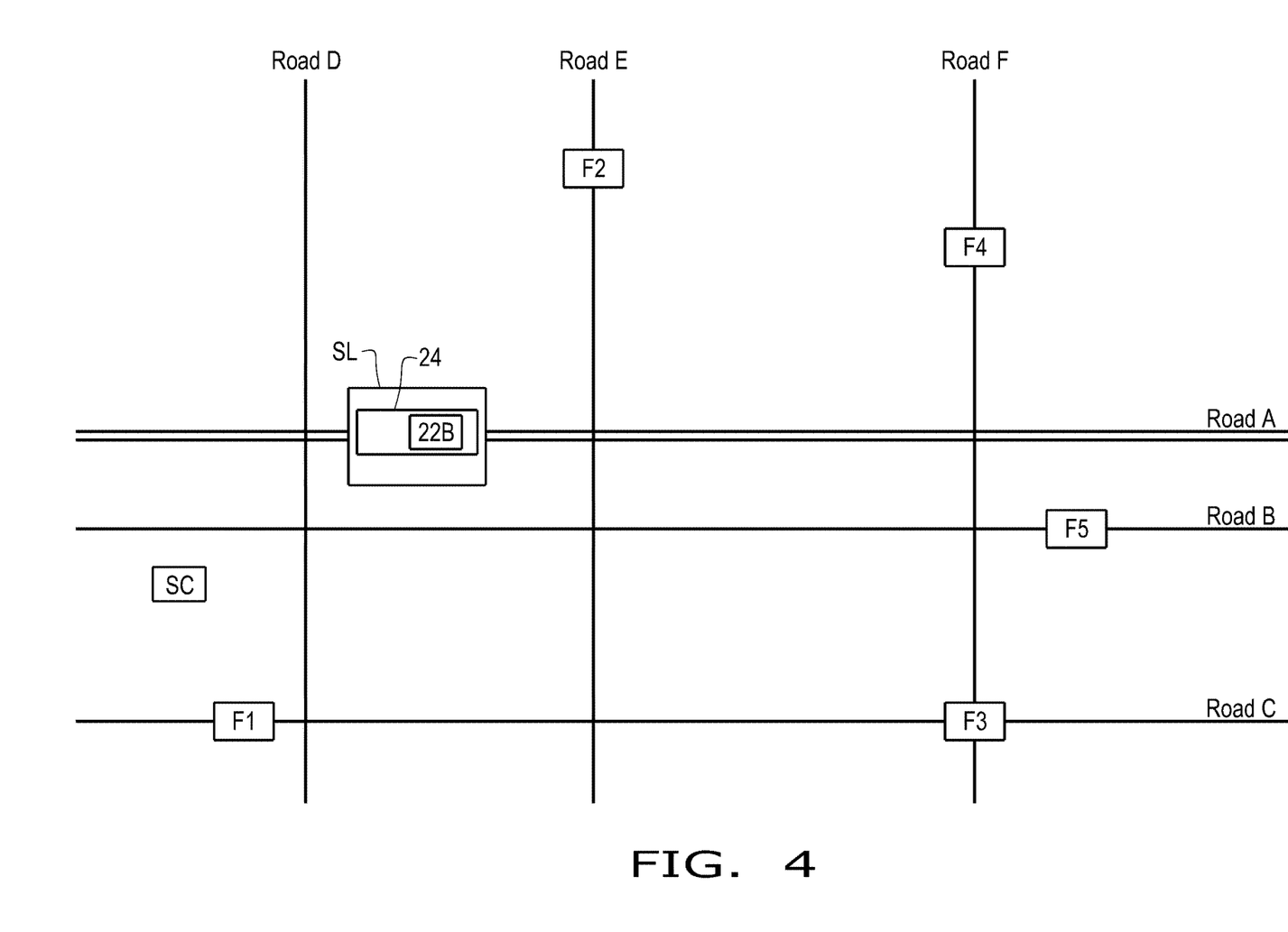
FIG. 4 illustrates a schematic view of another possible standby location of the replacement forage harvester in relation to a roadway map.
Figure 5:
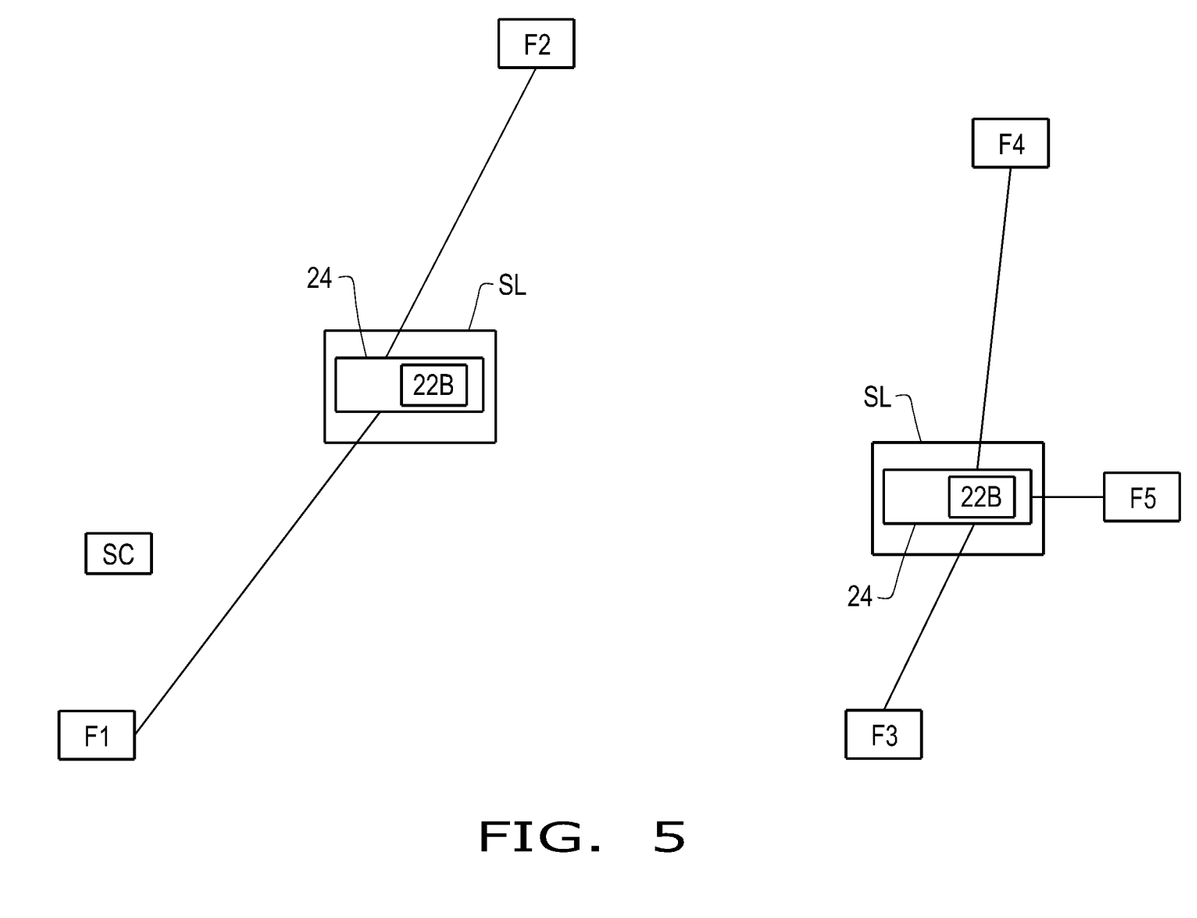
FIG. 5 illustrates a schematic view of two possible standby locations for prepositioning two replacement forage harvesters.

The delivery system 20 may include only one transport vehicle 24 (FIGS. 2-4) or multiple transport vehicles 24 (FIG. 5). Each transport vehicle 24 may comprise a truck and a trailer for transporting the forage harvester 22B thereon. Each transport vehicle 24 may be an autonomous or semi-autonomous transport vehicle 24. Therefore, each transport vehicle 24 may automatically drive itself to any desired standby location SL or field F1, F2, F3, F4, F5 upon its vehicle control unit (VCU) receiving a corresponding command from the controller 26. Alternatively, each transport vehicle 24 may not be an autonomous or semi-autonomous transport vehicle 24. It should be appreciated that each transport vehicle 24 may or may not be driven by an operator, regardless of whether each transport vehicle 24 is an autonomous or semi-autonomous transport vehicle 24.

Figure 3:
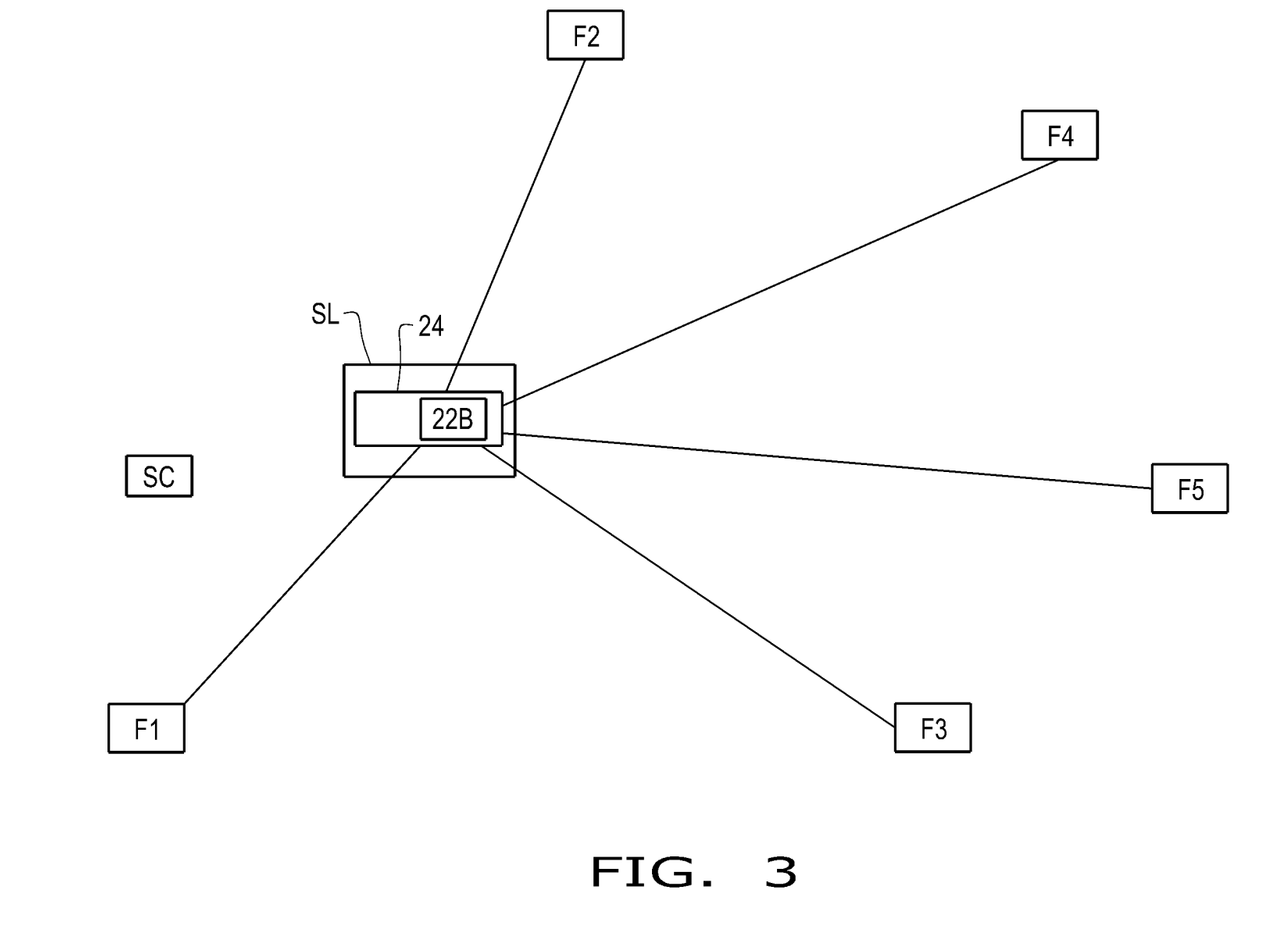
FIG. 3 illustrates a schematic view of a possible standby location of the replacement forage harvester.

The controller 26 generally includes a memory 28, a processor, and one or more communication nodes for establishing communication with a service requester, the transport vehicle(s) 24, and/or the forage harvester(s) 22A, 22B. The controller 26 may receive the service signal from the service requester by way of any desired communication method, such as a data transfer or a telephonic communication between the farmer and a call center. For instance, the controller 26 may receive the service signal from the service indicator 30, 32. The controller 26 may also receive inputted or sensed information in order to subsequently calculate the ideal standby location SL for the transport vehicle 24. For example, a service operator may input various standby location variables, as defined below, into the controller 26 through a user interface. Additionally, for example, the controller 26 may be operably connected to and receive standby location variables from a global positioning system (GPS) sensor of the transport vehicle 24, a GPS sensor of the forage harvester 22A, a roadway mapping service or database, a weather monitoring service, a maintenance database which tracks the maintenance of the forage harvester 22A, and any other desired sensor or database. The controller 26 may also receive any desired instruction, chart, or algorithm which can be inputted by the service operator and subsequently used to determine the ideal standby location SL. From the standby location variables, the controller 26 may calculate the ideal standby location SL for the transport vehicle(s) 24. For example, the controller 26 may plot the locations of the fields F1, F2, F3, F4, F5 relative to a home position, i.e. location of the service center SC, in a rectangular coordinate system (FIG. 3). Then, the controller 26 may compare the coordinates and calculate a middle-ground point between the fields F1, F2, F3, F4, F5. In other words, the controller 26 will determine an optimized location relative to the fields F1, F2, F3, F4, F5 that reduces the average/overall response time to each farm F1, F2, F3, F4, F5. For example, the controller 26 may set a point that is approximately 50 kilometers (31 miles) from each field F1, F2, F3, F4, F5, plus or minus 10 kilometers (6 miles) if this meets the acceptable response time to all fields F1, F2, F3, F4, F5. Additionally or alternatively, the controller 26 may overlay the locations of the fields F1, F2, F3, F4, F5 and/or the calculated middle-ground point with roadway map data (FIG. 4). Thereafter, the controller 26 may compare the physical locations of the fields F1, F2, F3, F4, F5, a preset a maximum-allowed delivery time, a requested delivery time which was previously requested by a service requester, and/or a real-time estimated delivery time from one or more precalculated points relative to the fields F1, F2, F3, F4, F5 in order to select a standby location SL that is dually optimized with respect to parking availability, proximity to fields, number of forage harvesters 22B per field, and respective delivery time. After calculating the standby location SL, the controller 26 can send a control command to the transport vehicle 24 so that the transport vehicle 24 is driven to the standby location SL, where the transport vehicle 24 will wait until further notice. Then, when a service signal is communicated to the controller 26, the controller 26 will send a corresponding delivery command to the transport vehicle 24 so that the transport vehicle 24 is driven to the field F1, F2, F3, F4, F5 in need of the replacement forage harvester 22B. The controller 26 may update the standby location SL in real-time so that if a new service requestor is added to the list or if an existing service requester has finished harvesting, then the controller 26 may send an updated standby location SL to the transport vehicle 24.

Figure 2:
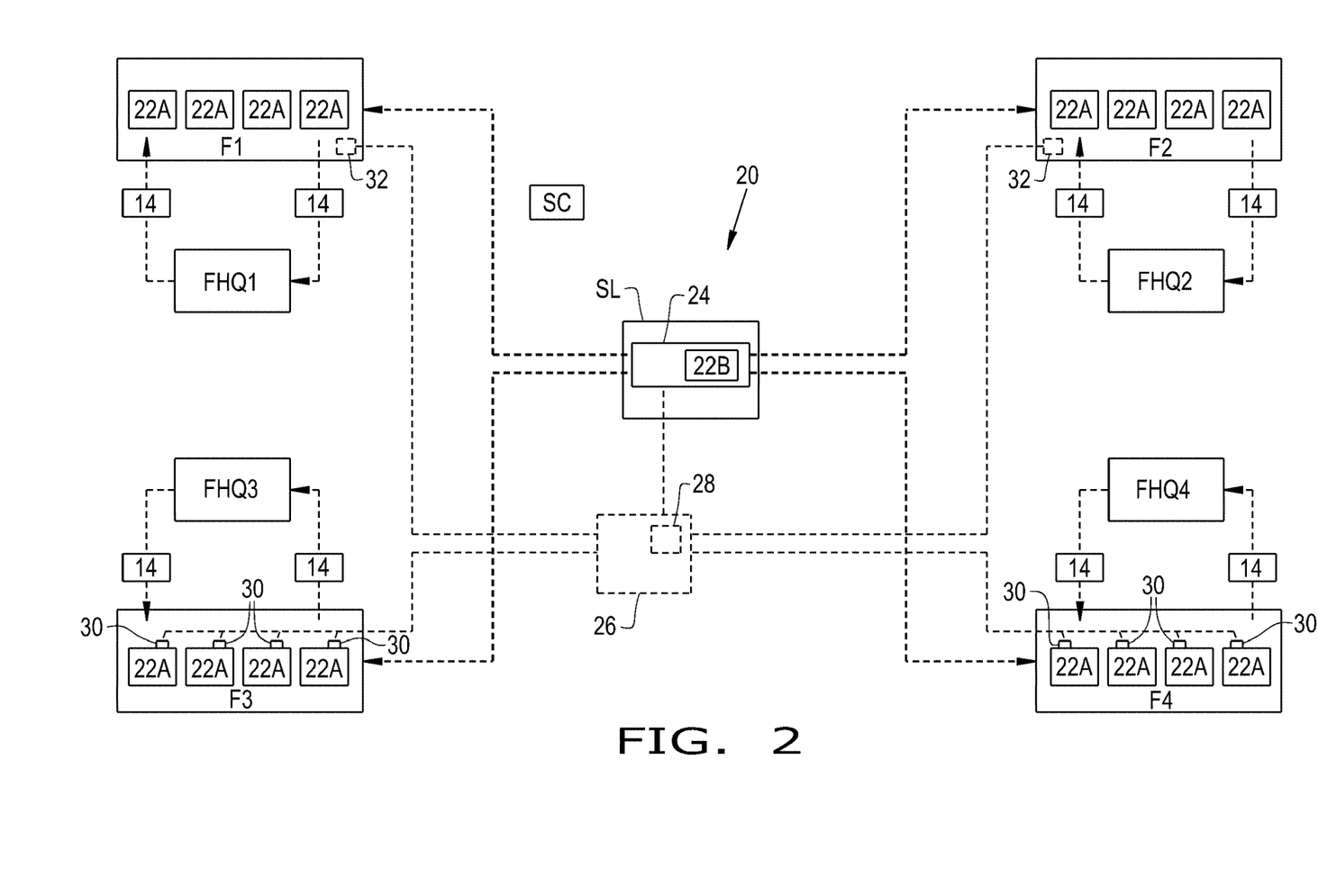
FIG. 2 illustrates a schematic view of a delivery system for replacing agricultural equipment, in accordance with an exemplary embodiment of the present invention.

Each service indicator 30, 32 is operably coupled to the controller 26. For instance, each service indicator 30, 32 may have one or more communication nodes for communicating with the one or more communication nodes of the controller 26. Each service indicator 30 may be in the form of a sensor 30 connected to a respective forage harvester 22A for sensing a working status of the forage harvester 22A in the field F1, F2, F3, F4, F5 of the service requester (FIG. 2). Additionally or alternatively, each service indicator 32 may be in the form of a communication device 32, such as the farmer's cellular phone, that is manually operated by the farmer.

Referring now specifically to FIG. 5, there is shown another possible delivery solution which has been determined by the delivery system 20, wherein the controller 26 has calculated that two or more replacement forage harvesters 22B are required to service the fields F1, F2, F3, F4, F5. If the controller 26 determines that it is not possible to deliver a replacement forage harvester 22B to each field within the maximum-allowed delivery time and/or requested delivery time, then the controller 26 may add another transport vehicle 24, with another replacement forage harvester 22B thereon, and calculate a respective standby location SL for each transport vehicle 24. As can be appreciated, the controller 26 may determine that one, two, three, four or more transport vehicles 24, with replacement forage harvesters 22B thereon, are required to service any desired number of fields.

Figure 6:
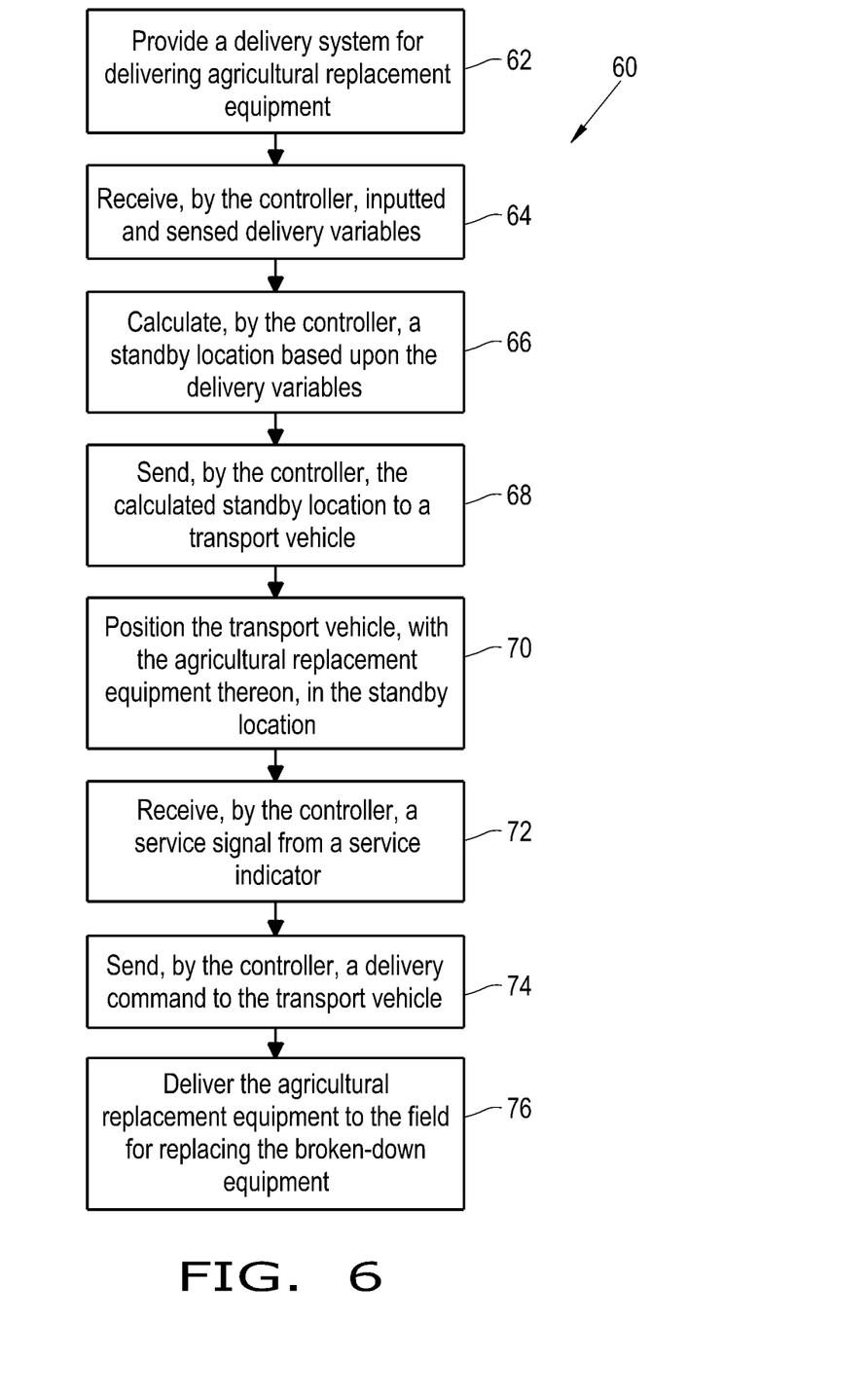
FIG. 6 illustrates a flowchart of a method for operating the delivery system.

Referring now to FIG. 6, there is shown a flowchart of a method 60 for operating the delivery system 20. By way of example only, the method 60 is described herein with respect to the agricultural delivery system 20, as discussed above, for delivering agricultural replacement equipment. However, the method 60 may be used to deliver and replace any desired capital good. The method 60 includes an initial step of providing the agricultural delivery system 20, as discussed above (at block 62). In operation, the service requester may notify the controller 26 of the dates and times when harvesting at a particular field F1, F2, F3, F4, F5 will occur. The controller 26 may accordingly receive this information along with any other sensed and/or inputted delivery variables, i.e., the standby location variables as discussed herein (at block 64). The controller 26 may then calculate the standby location SL based upon the delivery variables (at block 66). Then, the controller 26 may communicate this standby location SL to the transport vehicle 24 (at block 68). Thereafter, the transport vehicle 24 with the forage harvester 22B thereon may be positioned, e.g. autonomously driven or driven by an operator, to the standby location SL (at block 70). The transport vehicle 24 will then wait at the standby location SL. If there is an equipment failure, the service requester will send the service signal to the controller 26 via the service indicator 30, 32, and the controller 26 will accordingly receive the service signal (at block 72). Then, the controller 26 will send a corresponding delivery command to the transport vehicle 24 (at block 74). The controller 26 may also send the location of the field F1, F2, F3, F4, F5 in need of replacement equipment to the transport vehicle 24. The transport vehicle 24 will then deliver the forage harvester 22B to the desired field F1, F2, F3, F4, F5 (at block 76). Then, the broken-down forage harvester 22A may be replaced by the replacement forage harvester 22B. Thereafter, the controller 26 may command the transport vehicle 24 to transport the broken-down forage harvester 22A to the service center SC. As can be appreciated, after delivering the replacement forage harvester 22B, the controller 26 may recalculate the standby location SL. The method 60 may be carried out as many times as needed in order to service any desired number of fields F1, F2, F3, F4, F5.

As used herein, a service requester refers to a farmer and/or agricultural machine that is a member of the delivery service 20. Thereby, the service signal may be communicated by the farmer or the agricultural machine itself. For example, if the agricultural equipment breaks down, the farmer may dial a number of an automated call center and notify the call center that the replacement equipment is needed. Thereafter, the call center may notify the controller 26 that this particular service requester is in need of the replacement equipment. Additionally, for example, the agricultural machine may be equipped with one or more status-monitoring sensors, e.g. the indicator sensor 30, such that upon a sensed state, such as an operating state, a service-needed state, or an operating-failure state, the agricultural machine itself will automatically provide its sensed state to the controller 26. Also, agricultural machine itself may notify the controller 26 of its current location and whether it is presently harvesting in a given field F1, F2, F3, F4, F5. As can be appreciated, the delivery service 20 may accommodate one or multiple service requesters.

As used herein, the term delivery information refers to any desired information which is used to calculate the standby location SL. The delivery information may include standby location variables. The standby location variables may comprise two or more of a preset maximum-allowed delivery time, a number of service requesters, at least one delivery location, a requested and/or mutually agreed upon delivery time requested and/or agreed upon by the service requester, location data of the transport vehicle(s) 24 and/or service indicator 30, 32, roadway map data, an estimated delivery time, traffic data, weather data, an availability of replacement equipment, e.g. forage harvester(s) 22B, a capacity compatibility between the broken-down and replacement equipment, a compatibility of the mission being performed, and machine specific data such as the operational status and/or statistical data of the machine, e.g. the insured forage harvester 22A. Machine specific data may include a sensed status of the machine via the sensor 30, indicating the age of the machine, a typical and/or current mission of the machine, and real-time performance metrics such as machine temperature, oil pressure, fuel consumption, etc. Additionally, machine specific data may also include an estimated machine reliability, e.g. an estimated reliability of the insured forage harvester 22A. The estimated reliability of the machine may be based upon model year, known quality issues, past maintenance, service, or health records, and/or the future maintenance schedule, historical breakdown data, and a typical and/or current mission of the machine. The controller 26 of the delivery system 20 may be preprogramed to provide replacement equipment within a guaranteed maximum-allowed delivery time. For example, the delivery system 20 may guarantee that its service requesters will receive replacement equipment within a maximum of thirty minutes. The controller 26 may receive an inputted number of service requesters along with their corresponding delivery locations, i.e., field locations where the replacement equipment is to be delivered. A service requester can request a specific delivery time. To accommodate one or more requested delivery times, the controller 26 will prioritize the requested delivery times from the shortest time requested, i.e., smallest delivery time window, to the longest time requested. The roadway map data may be stored in the memory 28 of the controller 26 or provided to the controller 26 via an external roadway mapping service, such as Google Maps™. The estimated travel or delivery time from the standby location SL to the field F1, F2, F3, F4, F5 may be calculated by the controller 26 or provided to the controller 26 by the roadway mapping service. The estimated delivery time may be based upon the proximity from all of the forage harvesters 22A being services, the accessibility to the fields F1, F2, F3, F4, F5, the current traffic, and/or the current weather conditions. The estimated machine reliability of the agricultural machine may be inputted into the controller 26 or calculated by the controller 26.

It is to be understood that the method 60 of the delivery system 20 may be conducted by the controller 26 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 26 described herein is implemented in software code or instructions which are tangibly stored on a tangible computer readable medium. The controller 26 loads the software code or instructions via a direct interface with the computer readable medium or via a wired and/or wireless network. Upon loading and executing such software code or instructions by the controller 26, the controller 26 may perform any of the functionality of the method 60 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A method for delivering at least one replacement machine to replace at least one broken-down machine, comprising:
    providing a delivery system comprising at least one transport vehicle for transporting the at least one replacement machine and a controller operably coupled to and in communication with the at least one transport vehicle;
    receiving, by the controller, information that includes standby location variables;
    calculating, by the controller, a standby location for the at least one transport vehicle based upon the standby location variables;
    sending, by the controller, the standby location to the at least one transport vehicle;
    positioning, by the at least one transport vehicle, the at least one replacement machine at the standby location; and
    delivering the at least one replacement machine, by the at least one transport vehicle, from the standby location to a field of a service requester.

2. The method of claim 1, wherein the at least one transport vehicle comprises an autonomous or semi-autonomous transport vehicle.

3. The method of claim 1, wherein the delivery system further comprises at least one service indicator operably coupled to the controller, and the method further comprising a step of communicating a service signal, by the at least one service indicator, to the controller indicating a need for replacing the at least one broken-down machine.

4. The method of claim 3, further comprising a step of receiving, by the controller, the service signal and subsequently sending a delivery command to the at least one transport vehicle for initiating the step of delivering the at least one replacement machine.

5. The method of claim 4, wherein the at least one service indicator comprises at least one sensor connected to a machine for sensing a working status of the machine in the field of the service requester, and upon the machine breaking down, the at least one sensor sends the service signal to the controller indicating that the machine is broken down.

6. The method of claim 1, further comprising a step of replacing the at least one broken-down machine with the at least one replacement machine.

7. The method of claim 6, further comprising a step of transporting, by the at least one transport vehicle, the at least one broken-down machine to a service center.

8. The method of claim 1, wherein the at least one replacement machine comprises at least one replacement forage harvester.

9. A method for delivering at least one replacement machine to replace at least one broken-down machine, comprising:
provelling a delivery system comprising at least one transport vehicle for transporting the at least one replacement machine and a controller operably coupled to and in communication with the at least one transport vehicle;
receiving, by the controller, information that includes standby location variables;
calculating, by the controller, a standby location for the at least one transport vehicle based upon the standby location variables, wherein the standby location variables comprise two or more of a maximum-allowed delivery time, a number of service requesters, at least one delivery location, a requested delivery time, location data of the at least one transport vehicle, roadway map data, an estimated delivery time, and an estimated machine reliability;
sending, by the controller, the standby location to the at least one transport vehicle; and
positioning, by the at least one transport vehicle, the at least one replacement machine at the standby location.

10. A delivery system for delivering at least one replacement machine to replace at least one broken-down machine, comprising:
at least one transport vehicle for transporting the at least one replacement machine; and
a controller operably coupled to and in communication with the at least one transport vehicle, and the controller is configured for:
receiving information that includes standby location variables;
calculating a standby location for the at least one transport vehicle based upon the standby location variables; and
sending the standby location to the at least one transport vehicle,
wherein the at least one transport vehicle is configured for:
positioning the at least one replacement machine at the standby location; and
delivering the at least one replacement machine from the standby location to a field of a service requester.

11. The delivery system of claim 10, wherein the at least one transport vehicle comprises an autonomous or semi-autonomous transport vehicle.

12. The delivery system of claim 10, wherein the standby location variables comprise two or more of a maximum-allowed delivery time, a number of service requesters, at least one delivery location, a requested delivery time, location data of the at least one transport vehicle, roadway map data, an estimated delivery time, and an estimated machine reliability.

13. The delivery system of claim 10, further comprising at least one service indicator operably coupled to the controller, and the at least one service indicator is configured for communicating a service signal to the controller indicating a need for replacing the at least one broken-down machine.

14. The delivery system of claim 13, wherein the controller is further configured for receiving the service signal and subsequently sending a delivery command to the at least one transport vehicle for initiating a delivery of the at least one replacement machine.

15. The delivery system of claim 14, wherein the at least one service indicator comprises at least one sensor connected to a machine for sensing a working status of the machine in the field of the service requester, and upon the machine breaking down, the at least one sensor sends the service signal to the controller indicating that the machine is broken down.

16. The delivery system of claim 10, wherein the at least one broken-down machine is configured to be replaced with the at least one replacement machine upon delivery of the at least one replacement machine.

17. The delivery system of claim 16, wherein the at least one transport vehicle is configured for transporting the at least one broken-down machine to a service center.

18. A delivery system for delivering at least one replacement machine to replace at least one broken-down machine, comprising:
at least one transport vehicle for transporting the at least one replacement machine, wherein the at least one replacement machine comprises at least one replacement forage harvester; and
a controller operably coupled to and in communication with the at least one transport vehicle, and the controller is configured for:
receiving information that includes standby location variables;
calculating a standby location for the at least one transport vehicle based upon the standby location variables; and
sending the standby location to the at least one transport vehicle,
wherein the at least one transport vehicle is configured for positioning the at least one replacement machine at the standby location.

* * * * *